(12) United States Patent
Gaash

(10) Patent No.: US 12,307,141 B2
(45) Date of Patent: May 20, 2025

(54) IMPOSING PRINT JOBS ACROSS A PRINT MEDIUM FOR FRAME-BY-FRAME PRINTING

(71) Applicant: Hewlett-Packard Development Company, L.P., Spring, TX (US)

(72) Inventor: Amir Gaash, Ness Ziona (IL)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 71 days.

(21) Appl. No.: 18/554,259

(22) PCT Filed: Apr. 8, 2021

(86) PCT No.: PCT/US2021/026325
§ 371 (c)(1),
(2) Date: Oct. 6, 2023

(87) PCT Pub. No.: WO2022/216288
PCT Pub. Date: Oct. 13, 2022

(65) Prior Publication Data
US 2024/0289074 A1     Aug. 29, 2024

(51) Int. Cl.
G06F 3/12        (2006.01)
(52) U.S. Cl.
CPC .......... G06F 3/1251 (2013.01); G06F 3/1205 (2013.01); G06F 3/1243 (2013.01)
(58) Field of Classification Search
CPC ..... G06F 3/1251; G06F 3/1205; G06F 3/1243
USPC ....................................................... 358/1.18
See application file for complete search history.

(56) References Cited

U.S. PATENT DOCUMENTS

| | | | |
|---|---|---|---|
| 7,812,997 B2 | 10/2010 | Morales et al. | |
| 8,817,324 B2 | 8/2014 | Giannetti et al. | |
| 8,891,126 B2 | 11/2014 | Tufano | |
| 9,050,837 B2 * | 6/2015 | Rodriguez Alonso | ....................... G06K 15/107 |

(Continued)

FOREIGN PATENT DOCUMENTS

| CN | 102035959 A | 4/2011 |
|---|---|---|
| CN | 109416623 A | 3/2019 |

(Continued)

OTHER PUBLICATIONS

Shoji, Y. et al. "Mitsubishi Variable Size Commercial Web Offset Press", Mitsubishi Heavy Industries, Ltd, vol. 43, Issue 3, Sep. 2006, pp. 3.

*Primary Examiner* — Allen H Nguyen
(74) *Attorney, Agent, or Firm* — Jordan IP Law, LLC

(57) ABSTRACT

Examples are described herein for imposing print jobs across lane(s) of a print medium web for frame-by-frame printing. A frame rewind distance (FRD) may be set to a length of a longest pattern of the print jobs and a frame repeat length (FRL) may be set to a difference between a frame length and the FRD. For each lane of a first frame of the frame-by-frame printing: patterns of one of the print jobs may be imposed along a length of the lane, and a distance that a tail end of the one of the patterns extends beyond the FRL may be preserved as a respective gap length for the lane in a second frame. For each lane of the second frame of the frame-by-frame printing, patterns of one of the print jobs may be imposed beginning at the respective preserved gap length.

15 Claims, 6 Drawing Sheets

(56) References Cited

U.S. PATENT DOCUMENTS

| | | |
|---|---|---|
| 10,324,666 B2 | 6/2019 | Himpe |
| 2004/0003342 A1 | 1/2004 | Keane et al. |
| 2009/0033978 A1 | 2/2009 | Morales |
| 2009/0060610 A1 | 3/2009 | Matsuhashi |
| 2011/0069329 A1 | 3/2011 | Abe et al. |
| 2015/0001783 A1* | 1/2015 | Gann-Fetter ........... B65H 45/04 270/58.3 |
| 2015/0015901 A1* | 1/2015 | Devlieghere .......... H04N 1/233 358/1.9 |
| 2015/0104613 A1 | 4/2015 | Morales Garcia De La Vega et al. |
| 2019/0034139 A1 | 1/2019 | Gaash et al. |
| 2019/0056892 A1 | 2/2019 | Himpe |
| 2019/0255839 A1 | 8/2019 | Izawa et al. |
| 2020/0128135 A1* | 4/2020 | Matsushita ........... G06F 3/1243 |
| 2021/0370662 A1* | 12/2021 | Slegers .................... B41C 1/18 |

FOREIGN PATENT DOCUMENTS

| | | |
|---|---|---|
| WO | 2011/155950 A1 | 12/2011 |
| WO | 2017/182083 A1 | 10/2017 |

\* cited by examiner

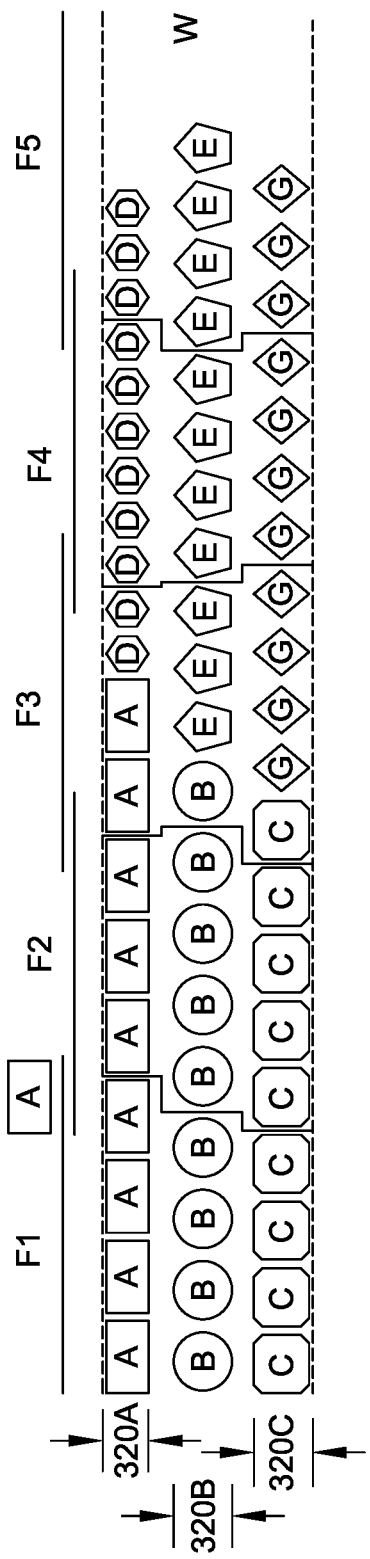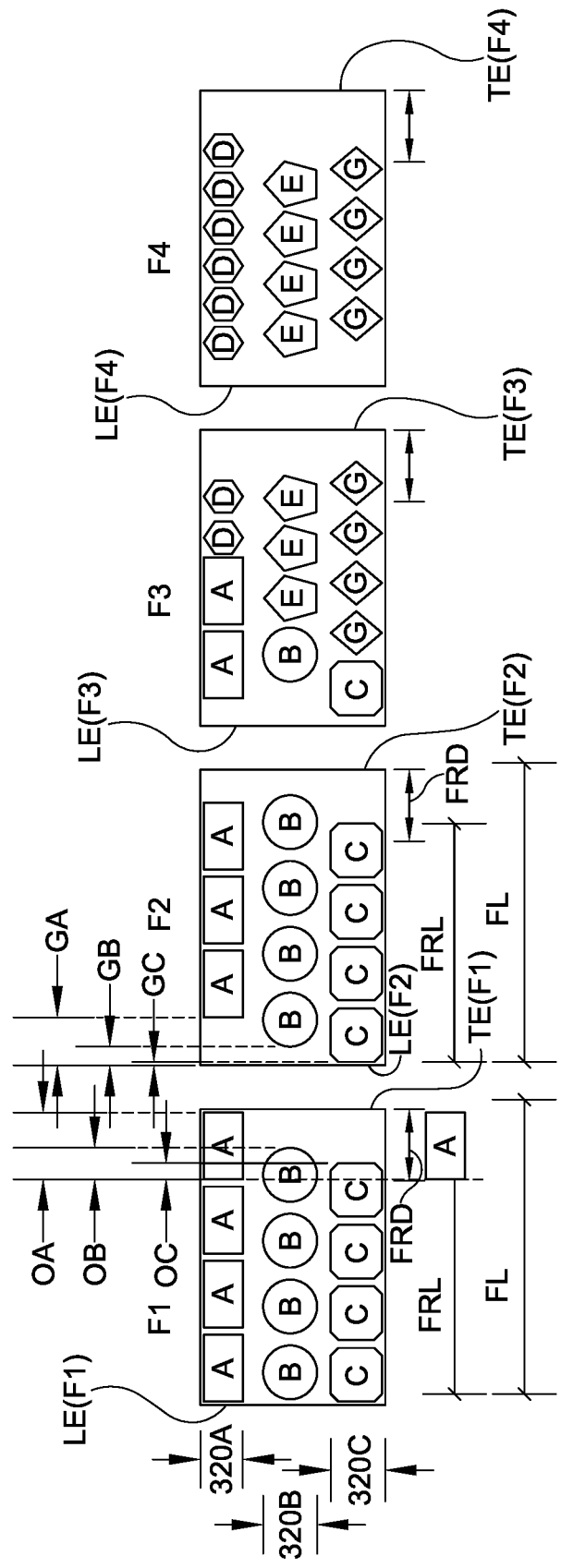
FIG. 3a
FIG. 3b

IMPOSING PRINT JOBS ACROSS A PRINT MEDIUM FOR FRAME-BY-FRAME PRINTING

BACKGROUND

When printing on a wide web of print medium, several print jobs may be aggregated and imposed to fill the web as much as possible. As a consequence, on the same web there may be patterns or images that are different from each other, for example from different print jobs.

Furthermore, when print jobs are printed on a web that is wider than the patterns of the print jobs, the patterns may be imposed and printed in several longitudinal lanes along the web. The web may thereafter be slit to form narrower rolls, one for each lane, and therefore each roll having one row of patterns. It may be useful, for example when printing labels, that all the labels in one lane are the same and that they are spaced uniformly, such that they may subsequently be applied using an automatic device.

Another example may be printing photos at different sizes on a 4" wide lane and an 8" wide lane. The 4" wide lane may include photos with different lengths but the same 4" width, such as 3"×4", 4"×4", 5"×4", or 6"×4" photos, and the 8" wide lane may include photos with different lengths but the same 8" width, such as 5"×8", 6"×8", 8"×8", 10"×8", or 12"×8" photos. The different sizes photos may be printed continuously without gaps in a frame-by-frame printing apparatus. The same occurs with other print jobs that may be subsequently handled in an automated way.

Print jobs may also be printed on a web of print medium in a frame-by-frame printing apparatus, for example a web press comprising a rotary printing drum with a flexible blanket. In this case, when printing jobs are imposed on the web of print medium, account may be taken of the frame length, i.e. the maximum size of the frames in the longitudinal direction of the web, which depends on the size of the blanket.

BRIEF DESCRIPTION OF THE DRAWINGS

Features of the present disclosure are illustrated by way of example and not limited in the following figure(s), in which like numerals indicate like elements.

FIG. 3a and FIG. 3b are schematic diagrams illustrating print jobs imposed in consecutive frames to be printed on a web of print medium, according to an example of the present disclosure.

DETAILED DESCRIPTION

Figure 1:
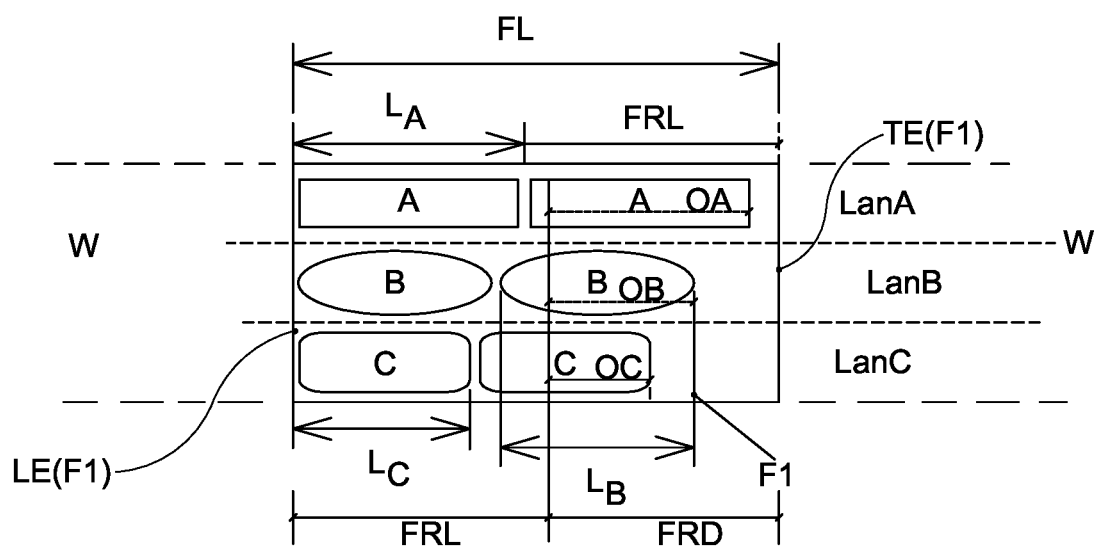
FIG. 1 illustrates schematically an example of a frame on which patterns are imposed in lanes, according to an example of the present disclosure.

Disclosed herein are methods for aggregating print jobs in longitudinal lane(s) on a web of print medium, to be printed in a frame-by-frame printing apparatus. A print job defines a predetermined set of images, frames, or data to be printed out in one lane or in multiple lanes of the web of print medium.

Each print job may include patterns to be printed. For example, the patterns may be labels, e.g. labels to be later applied to a product, or blanks to be subsequently transformed into boxes or other packages by punching, folding and applying adhesive, for example in automated lines, or any other kind of image. Each print job may also include a predetermined number of repetitions or copies of a pattern, such as a label or other images.

Print jobs to be aggregated on a web of print medium may include patterns that are different from one print job to another. The patterns may have different shapes and sizes. For example, the patterns of one print job may have a pattern length, herein defined as the maximum dimension of the pattern in the longitudinal direction of the web of print medium, while the patterns of another print job may have another pattern length.

When jobs are imposed on a web of print medium for frame-by-frame printing, account may be taken of the frame length, e.g., the maximum size of the frames in the longitudinal direction of the web. The frame length depends on the printing apparatus that is going to be used. For accuracy, the patterns may be imposed on the web of print medium frame by frame, with some number of whole patterns being imposed in each frame, such that no pattern spans two consecutive frames. Thus, the imposed patterns may not fill the whole frame length: for example, if they are imposed starting from the leading edge of each frame, a blank space or gap may remain between the last imposed pattern and the trailing edge of the frame. Such a gap involves a waste of print medium, and it may prevent the patterns from being evenly and suitably spaced along the web.

When patterns that are imposed in different lanes of a web of print medium all have the same length, then the gap or blank space remaining at the end of the frame is the same for all the lanes, and for all the frames. A solution for avoiding the gap may be rewinding the web a constant rewind distance after printing each frame. However, when print jobs to be aggregated have different pattern lengths, such that patterns imposed in different lanes of the web of print medium have different pattern lengths, then the gaps at the end of a frame may be different from one lane to another.

Examples are described herein for imposing multiple different print jobs in several parallel longitudinal lanes on a web of print medium, to be printed in a frame-by-frame printing apparatus. In various examples, a fixed "frame rewind distance" or "FRD" may be constant across all frames (as opposed to being different for each frame). After printing each frame, the web may be rewound by the same frame rewind distance, and then the next frame may be printed. In various examples and as described below, the fixed frame rewind distance may be selected based on a longitudinal length of the longest pattern of any of the print jobs.

In various examples, a "frame repeat length" or "FRL" may also be determined. The frame repeat length may be a reference length that is calculated as a difference between a length of the frame (which may be constant across all frames) and the frame rewind distance. The frame repeat length may be used to determine, for a given lane of the web, a "gap length" (e.g., a length for which nothing is printed) to be imposed between a leading edge of a next frame and a leading edge of the first pattern of the next frame. In some examples, the next frame's gap length may be calculated as equal to a distance that a last pattern of the current frame extends beyond the frame repeat length. In some examples, the next frame's gap may be calculated as a sum of a gap length of a prior frame and a combined length of the patterns imposed along the length of the lane, minus the frame repeat length.

This situation is illustrated by the example of FIG. 1. In FIG. 1, a frame F1 has a frame length FL in the longitudinal direction of the web W of a print medium, between a leading edge LE (F1) of the frame and a trailing edge TE (F1) of the frame. Three different patterns, A, B, and C, having respective pattern lengths, $L_A$, $L_B$ and $L_C$, are shown imposed in three parallel lanes, LanA, LanB, and LanC in the longitudinal direction of the web W of print medium, starting at the leading edge LE (F1) of the frame F1. The determination of a frame rewind distance FRD and a frame repeat length FRL as mentioned previously may be based on the frame length FL and the longest pattern length of the patterns A, B, C imposed in each lane in the frame F1.

The frame length FL may depend on the printing apparatus or process that is employed for printing the web of print medium, and it is the same for all the frames on which patterns are imposed, even though the imposed area may be shorter than the frame length FL and may be different from one frame to another. The leading edge LE of the frame is defined as the edge where printing starts on the frame during the printing operation on the web of print medium, e.g., the forward end in the direction of advance of the web of print medium during printing. The trailing edge TE of the frame is the opposite edge of the frame, e.g., the rearward end in the direction of advance of the web of print medium. In some examples, a starting point for imposition of patterns in each lane may be determined based on an end point of imposed patterns in the same lane in the previous frame.

Patterns to be imposed and printed may have shapes different from those shown in FIG. 1, including regular and irregular shapes, and may have different sizes and/or quantities in the direction of the width of the web. In some examples, the width of one lane may be different from the width of another lane. Each pattern may also include a number of smaller patterns or images, different from each other or equal, to be printed together. A plurality of parallel lanes may be defined on the web of print medium. As visible in FIG. 1, due to the different pattern lengths, and therefore the different lane lengths, the gaps at the end of the frame are different from one lane to another. In this case, if after printing one frame, the web of print medium is rewound by the rewind distance tailored to one of the lanes, in the other lanes there would be either a gap or an overlap.

In some examples, the frame rewind distance FRD may be determined such that if during the printing operation, after printing each frame, the web of print medium is rewound the determined frame rewind distance of the frame, then the starting point of each lane in one frame comes to be adjacent to the end point of the lane in the previous frame. However, rewinding frames of different lengths may be not supported by all printing apparatus, and even if supported may reduce the printing quality due to scaling challenges. Accordingly, in various examples, the frames may be rewound by a fixed value at each iteration.

Figure 2:
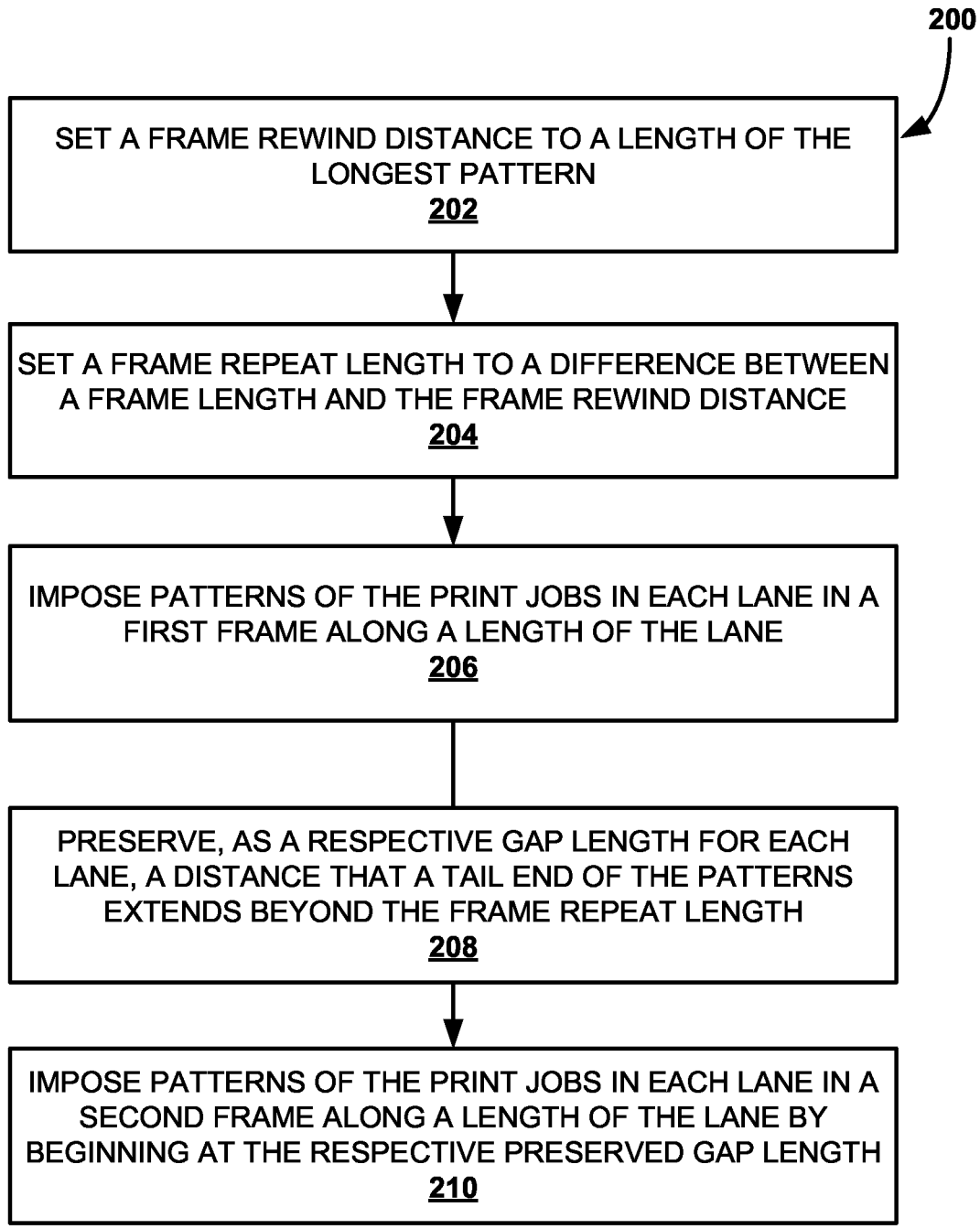
FIG. 2 is a flowchart illustrating an example method for aggregating print jobs on a web of print medium frame by frame, according to an example of the present disclosure.

FIG. 2 is a flow chart illustrating a method 200, according to an example of the present disclosure, for aggregating print jobs on a web of print medium for frame-by-frame printing. The method 200 includes imposing several print jobs, each with patterns to be printed, on a web of print medium in lane(s) in the longitudinal direction of the web of print medium.

Before the method 200 starts at block 202, in various examples, some number of print jobs may be received, with each including patterns to be printed. In some examples, such as the method demonstrated by FIG. 2, multiple parallel lanes may also be selected for imposing the print jobs on a web of print medium. However, this is not required, and in other examples, a single lane may be used.

At block 202, a frame rewind distance FRD may be set to a length of the longest patterns of the print jobs. For example, the frame rewind distance FRD for the frame F1 in FIG. 1 may be the pattern length $L_A$, because pattern A has the longest length among patterns A, B, and C. The expression "the longest patterns of the print jobs" indicates that a single pattern has an end point that is farther away from its starting point than any of the other patterns of the print jobs. At block 204, a frame repeat length FRL may be set to a difference between a frame length and the frame rewind distance. For example, in FIG. 1, the frame repeat length FRL for the frame F1 may be set as the difference between the frame length FL and the frame rewind distance FRD (e.g., the pattern length $L_A$).

At block 206, patterns may be imposed in each lane (e.g., the three parallel lanes LanA, LanB, and LanC as shown in FIG. 1) in a first frame (e.g., the frame F1 as shown in FIG. 1). At block 208, a distance that a tail end of the patterns extends beyond the frame repeat length in each lane may be preserved, e.g. in computer memory, as a respective gap length for the same lane in the next frame. In FIG. 1, pattern A extends beyond the repeat length FRL by an overlap distance of OA, pattern B extends beyond the repeat length FRL by an overlap distance of OB, and pattern A extends beyond the repeat length FRL by an overlap distance of OC. In various examples, these overlap distances OA, OB, and OC may be preserved, e.g., in computer memory, and used as gap distances GA, GB, and GC in the lanes of the next frame (not depicted in FIG. 1, see FIGS. 3a and 3b).

At block 210, patterns may be imposed each lane in a second frame along a length beginning at the respective preserved gap length. For example, as shown in FIG. 3b, the imposition of the patterns in a second frame F2 may be performed along a length of the frame F2 beginning at gap lengths GA, GB, and GC, which are equal to overlap lengths OA, OB, and OC in the previous frame F1 for each lane respectively. As a result, the shape collectively defined by the starting points of the lanes at the beginning of a frame may be complementary to the shape collectively defined by the end points of the corresponding patterns at the end of the previous frame. Accordingly, there is a fixed frame rewind distance that may bring the starting point of each lane of the frame adjacent to the end point of the same lane in the previous frame. Then, the same process may be repeated for the following frames, until all the patterns of the print jobs to be aggregated are imposed. In such a manner, techniques described herein allow for aggregation of print jobs, even jobs comprising patterns that have different pattern lengths, and imposition of the print jobs across parallel lanes of a web of print medium. In the ultimate printed product, the patterns may be evenly spaced in each lane along the web of print medium.

Imposing the patterns from a starting point in each lane that is related to the end point of the patterns in the same lane of the previous frame, and using a constant frame rewind distance and a frame repeat length, allows imposing and printing the jobs frame by frame, with a partial overlap of the frames, even if the patterns imposed in different lanes have different pattern lengths. In some examples, patterns having a first pattern length may be imposed in one lane and patterns having a second pattern length, different from the first pattern length, may be imposed in another lane. In some examples, one print job may be imposed in one lane, and another print job may be imposed in another lane.

FIGS. 3a and 3b illustrate an example of how the method 200 disclosed herein may be implemented in a particular scenario. FIGS. 3a and 3b show five consecutive frames, F1, F2, F3, F4, and F5, to be printed on a web of print medium. Frames F1-F5 may have the same frame length FL as was shown in FIG. 1, since they are intended to be printed using the same printing apparatus. Each frame n may extend between a leading edge LE (Fn) and a trailing edge TE (Fn). Patterns A, B, C, D, E, and G, which different pattern lengths in the longitudinal direction, may be imposed in the frames F1-F5 across three lanes, 320A, 320B, and 320C, of the web of print medium W. Frame F1 may be the first frame to be imposed and printed, frame F2 may be the next frame to be imposed and printed, and so on.

As explained previously, in the first imposed frame in the aggregated print job, which is the frame F1 in FIGS. 3a-b, the starting point for the imposition of patterns in each lane may coincide with the leading edge LE of the frame F1. In some examples, the starting points for the imposition of patterns in each lane of the next frame may be determined based on an overlap length preserved from the previous frame. For example, each starting point of the lanes in the frame F2 may be determined, respectively, based on the overlap length in the same lanes the in frame F1. Thus, in some examples of methods disclosed herein, the gap distance of each lane may be set at a distance from a leading edge of the frame that is equal to the overlap distance in the previous frame. The gap distance preserved from the previous frame for each lane may be a distance a tail end of the patterns extended beyond the frame repeat length in the same lane of the previous frame.

In the example shown in FIGS. 3a and 3b, starting point for the pattern A in the frame F2 is set at a gap distance GA from the leading edge LE (F2) of the frame F2 that is equal to a distance GA that a tail end of the pattern A extended beyond the frame repeat length FRL in the lane 320A of the frame F1. Similarly, the starting point for the pattern B in the frame F2 may be set at a gap distance GB from the leading edge LE (F2) of the frame F2 that is equal to a distance OB that a tail end of the patterns extended beyond the frame repeat length FRL in the lane 320B of the frame F1. The starting point for the pattern C in the frame F2 may be set at a gap distance GC from the leading edge LE (F2) of the frame F2 that is equal to a distance OC that a tail end of the patterns extended beyond the frame repeat length FRL in the lane 320C of the frame F1.

As visible in FIGS. 3a and 3b, this arrangement of the starting points of the different lanes in the frame F2 has the effect of forming a gap at the leading edge LE (F2) of the frame F2 with a shape that matches the area patterns extend beyond the frame repeat length FRL at the end of the frame F1. Therefore, there is a frame rewind distance FRD that may bring the starting point of each lane of the frame adjacent to the end point of the lane in the previous frame. The frame rewind distance FRD may be the distance the web of print medium is rewound after printing the previous frame, for example after printing the frame F1, and before the next frame, for example, the frame F2 is printed.

In some examples, the frame rewind distance FRD may be selected based on the longest pattern length among patterns A, B, C, D, E, and G. For example, with reference to FIGS. 3a and 3b, the frame rewind distance FRD (F1-F5) for rewinding the web of print medium after printing frame F1 may be the length of pattern A, which is the longest pattern among patterns A, B, C, D, E, and G.

In some examples, a frame repeat length FRL may be determined based on a difference between the frame length of F1-F5 and the longest pattern length among patterns A, B, C, D, E, and G. Rewinding the web of print medium by the frame rewind distance FRD after printing each frame may bring the starting points of patterns of all the lanes of a frame adjacent to the corresponding end points of patterns of the previous frame.

Whole patterns may be imposed in each lane of each frame from a respective starting point of each lane. As many whole patterns may be imposed in each lane, as fit in the available space in the lane. In some examples, the available space in each lane for imposing patterns is the space between the starting point of the lane and the trailing edge of the frame. The expression "whole patterns" is employed to mean that the entire pattern is imposed in one and the same frame. In other words, patterns are not printed partly in one frame and partly in another frame.

In the example of FIGS. 3a and 3b, whole patterns A, B and C are imposed respectively in the lanes 320A-C of the frame F2, each starting from its corresponding starting point previously determined. For example, four whole patterns A are imposed in the first lane 320A of the frame F1 because the available space in the first lane 320A of the frame F1 and the pattern length of pattern A do not allow a fifth whole pattern A to be imposed. Similarly, four whole patterns B are imposed in the second lane 320B of the frame F1, and four whole patterns C are imposed in the third lane 320C of the frame F1.

Examples of methods for aggregating print jobs on a web of print medium for frame-by-frame printing are illustrated in the following with reference to the example shown in FIGS. 3a and 3b, including numerical values. In the example, five prints jobs are aggregated, each print job including a pattern (A, B, C, D, E. and G) and a number of repetitions of the pattern. The patterns are imposed in three lanes 320A-C on the web of print medium, such that after printing the web may be slit in three rolls.

In this example, the frame length, i.e. the dimension of each frame in the longitudinal direction of the web, is FL=760 mm. The patterns A, B, and C have pattern lengths $L_A$=180 mm in the first lane 320A, $L_B$=160 mm in the second lane 320B, $L_C$=150 mm in the third land 320C. Additional patterns D, E, and G are also provided once patterns A, B, and C are completed. The patterns D, F, and F have pattern lengths LD=99 mm in the first lane 320A, LE=130 mm in the second lane 320B, and LG=128 mm in the third land 320C.

FIG. 3a shows how the five consecutive frames F1, F2, F3, F4, and F5 are ultimately printed on the web of print medium, and the process for the imposition of the patterns in each frame is described in detail in the following. The lines between different frames limiting the area are included in FIG. 3a for the sake of clarity, to highlight how the shape defined by the starting points of a frame may match/be complementary to the shape defined by the end points of the previous frame. FIG. 3b illustrates how patterns are imposed in the first four frames F1, F2, F3, and F4 without consideration of rewinding. Lines have been drawn in FIG. 3a identifying the borders of the image area printed by each frame.

In this example, in the first frame F1 to be printed, patterns are imposed from the leading edge of the frame, for each lane. For subsequent frames F2-F5, the starting point of each lane is set at a distance from the leading edge of the frame that is equal to an overlap length preserved from the previous frame as described previously. As mentioned previously, the frame rewind distance FRD for rewinding the web of print medium after printing the frame F2 may be the longest length of pattern, which is pattern A at 180 mm. According to the method illustrated in FIG. 2, the press may rewind every frame by 180 mm, and the repeat length FRL may be the frame length minus the rewind distance, which is 760−180=580 mm.

In the following examples, the starting points and the end points of each frame and lane are identified with their distance from the leading edge of the frame. Nine copies of patterns of A, B, and C are printed, and eleven copies of patterns of D, E, and G are printed.

Frame F1

The starting gap lengths for the frame F1 are zero because there is no previous frame. Thus, patterns are imposed from the leading edge LE (F1) of the frame F1 for each lane.

Imposition (maximum number of patterns in the available space):
  4 patterns A in the first lane 320A
  4 patterns B in the second lane 320B
  4 patterns C in the third lane 320C

The following overlap lengths OA, OA, and OC in the frame F1 are calculated (and preserved as gap lengths for the next frame F2) as sums of a gap length calculated from a previous frame (which is zero for frame F1) and a combined length of the patterns imposed along the length of the lane, minus the frame repeat length FRL:

$$OA(F1) = GA(F1) + 4 \times LA - FRL = 4 \times 180 - 580 = 140 \text{ mm}$$
$$OB(F1) = GB(F1) + 4 \times LB - FRL = 4 \times 160 - 580 = 60 \text{ mm}$$
$$OC(F1) = GC(F1) + 4 \times LC - FRL = 4 \times 150 - 580 = 20 \text{ mm}$$

Frame F2

The calculated overlap lengths OA, OB, and OC in the frame F1 will be used as respective starting gap lengths GA, GB, and GC in the frame F2, hence:

$$GA(F2) = OA(F1) = 140 \text{ mm}$$
$$GB(F2) = OB(F1) = 60 \text{ mm}$$
$$GC(F2) = OB(F1) = 20$$

Imposition:
  3 patterns A in the first lane 320A
  4 patterns B in the second lane 320B
  4 patterns C in the third lane 320C

The following overlap lengths OA, OB, and OC for the Frame F2 may be calculated and preserved for use as respective gap distances GA, GB, and GC in the frame F3:

$$OA(F2) = GA(F2) + 3 \times LA - FRL = 140 + 3 \times 180 - 580 = 100 \text{ mm}$$
$$OB(F2) = GB(F2) + 4 \times LB - FRL = 60 + 4 \times 160 - 580 = 120 \text{ mm}$$
$$OC(F2) = GC(F2) + 4 \times LC - FRL = 20 + 4 \times 150 - 580 = 40 \text{ mm}$$

Frame F3

The calculated overlap lengths OA, OB, and OC in the frame F2 will be used as the starting gap distances in the frame F3:

$$GA(F3) = OA(F2) = 100 \text{ mm}$$
$$GB(F3) = OB(F2) = 120 \text{ mm}$$
$$GC(F3) = OC(F2) = 40 \text{ mm}$$

Imposition:
  2 patterns A and 2 patterns D in the first lane 320A
  1 pattern B and 3 patterns E in the second lane 320B
  1 pattern C and 4 patterns G in the third lane 320C

The following overlap lengths will be calculated for the frame F3 and preserved for the frame F4:

$$OA(F3) =$$
$$GA(F3) + 2 \times LA + 2 \times LD - FRL = 100 + 2 \times 180 + 2 \times 99 - 580 = 78 \text{ mm}$$
$$OB(F3) = GB(F3) + 1 \times LB + 3 \times LE - FRL =$$
$$120 + 1 \times 160 + 3 \times 130 - 580 = 90 \text{ mm}$$
$$OC(F3) = GC(F3) + 1 \times LC + 4 \times LG - FRL =$$
$$40 + 1 \times 150 + 4 \times 128 - 580 = 122 \text{ mm}$$

Frame F4

The calculated overlap lengths OA, OB, and OC in the frame F3 will be used as the starting gap lengths in the frame F4:

$$GA(F4) = OA(F3) = 78 \text{ mm}$$
$$GB(F4) = OB(F3) = 90 \text{ mm}$$
$$GC(F4) = OC(F3) = 122 \text{ mm}$$

Imposition:
  6 patterns D in the first lane 320A
  4 patterns E in the second lane 320B
  4 patterns G in the third lane 320C

The following overlap lengths will be calculated for the frame F4 and preserved for the frame F5:

$$OA(F4) = GA(F4) + 6 \times LD - FRL = 78 + 6 \times 99 - 580 = 92 \text{ mm}$$
$$OB(F4) = GA(F4) + 4 \times LE - FRL = 90 + 4 \times 130 - 580 = 30 \text{ mm}$$
$$OC(F4) = GA(F4) + 4 \times LG - FRL = 122 + 4 \times 128 - 580 = 54 \text{ mm}$$

Frame F5

The calculated overlap lengths OA, OB, and OC in the frame F4 will be used as the starting gap lengths in the frame F5:

$$GA(F5) = OA(F4) = 92 \text{ mm}$$
$$GB(F5) = OA(F4) = 30 \text{ mm}$$
$$GC(F5) = OA(F4) = 54 \text{ mm}$$

Imposition:
  3 patterns D in the first lane 320A
  4 patterns E in the second lane 320B
  3 patterns G in the third lane 320C

Figure 4:
FIG. 4 is a schematic diagram of a data file produced, according to an example of the present disclosure.

In some examples, aggregating print jobs for frame-by-frame printing may include producing a data file DF, for example as shown schematically in FIG. 4. Such a data file DF may include the imposed IMP (F ... FN) print jobs on the web of print medium, frame-by-frame, from a first frame F1 to a last frame FN, and the respective gap lengths for each frame GL (F1 ... FN). In some examples, the data file may take the form of a Portable Document Format (PDF) file with one page for each frame, and a table with the respective gap lengths GL (F1 ... FN). In other examples, the data file DF may take the form of a JPG or JPEG, a postscript file, or another image format file, for each frame, and a table with the frame rewind distances. The data file DF may be provided to a printing apparatus for printing the aggregated jobs on a web of print medium.

Figure 5:
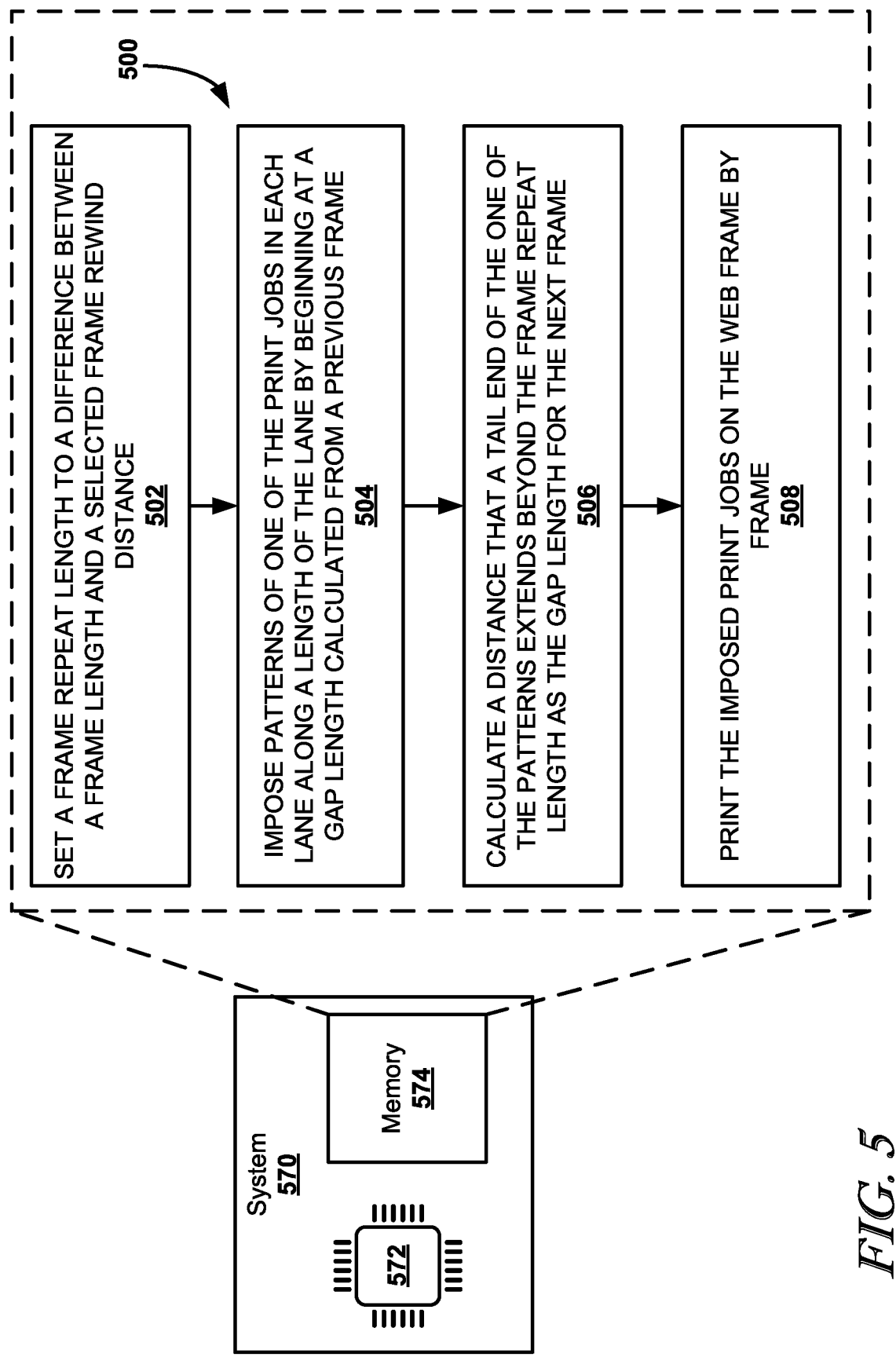
FIG. 5 is a schematic representation of a system, according to an example of the present disclosure.

FIG. 5 shows a schematic representation of a system 570, according to an example of the present disclosure. System 570 includes a processor 572 and memory 574 that stores non-transitory computer-readable instructions 500 for performing aspects of the present disclosure, according to an example. As illustrated here, instructions 502 cause the processor 572 to set a frame repeat length to a difference between a frame length and a selected frame rewind distance. In some examples, instructions 504 cause the processor 572 to impose patterns of one of the print jobs in each lane along a length of the lane by beginning at a gap length calculated from a previous frame.

Instructions 506 cause the processor 572 to calculate, for each lane as a gap length for the next frame, a distance that a tail end of the one of the patterns extends beyond the frame repeat length in the lane. Instructions 508 cause the processor 572 to print the imposed print jobs on the web frame by frame. The web of print medium may be rewound by the frame rewind distance after printing each frame. In some examples, the frame rewind distance may be selected based on a length of the longest pattern of the several print jobs.

Figure 6:
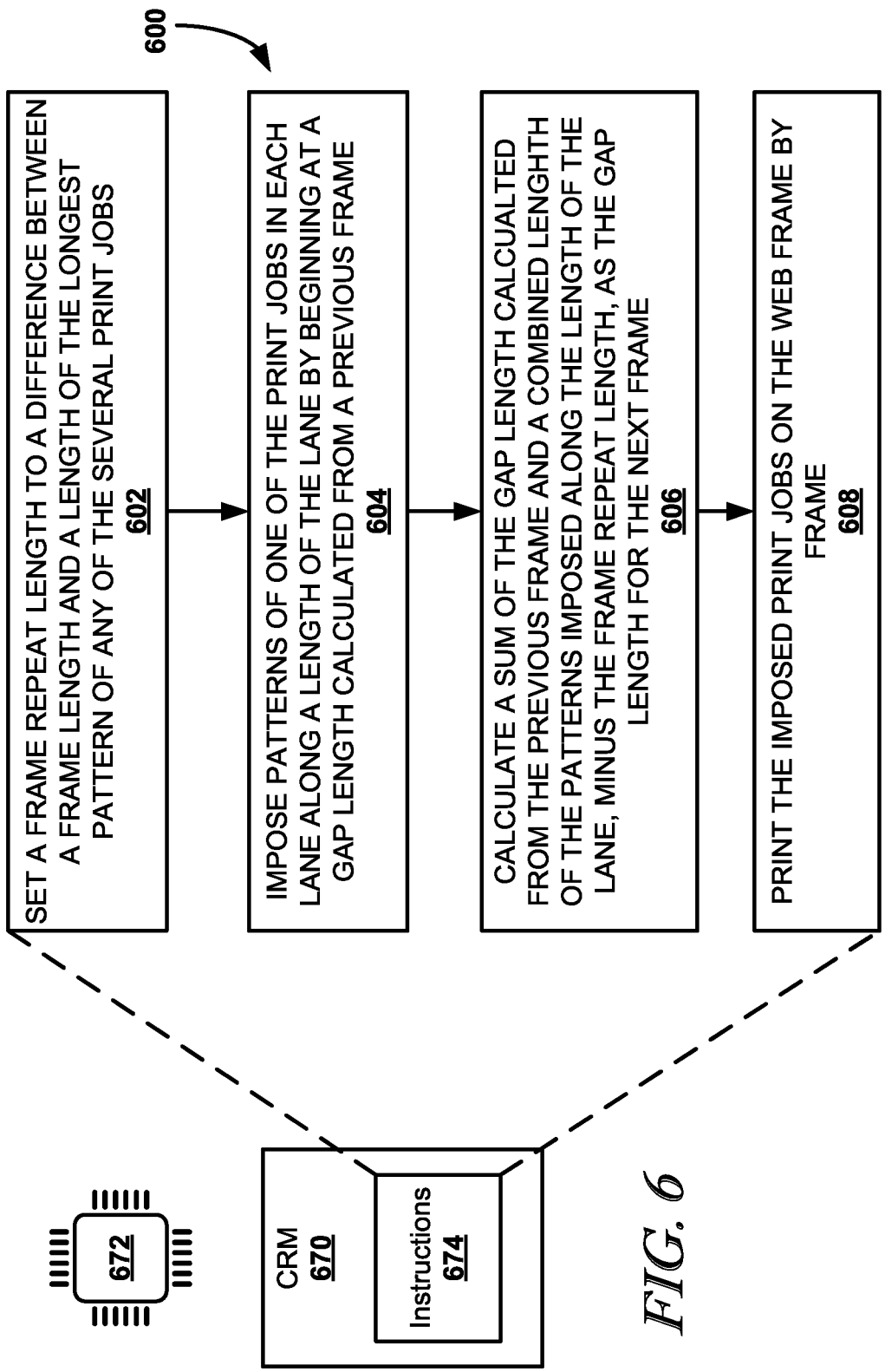
FIG. 6 is a schematic representation of a non-transitory computer-readable medium, according to an example of the present disclosure.

FIG. 6 shows a schematic representation of a non-transitory machine-readable storage medium (CRM) 670, according to an example of the present disclosure. The CRM 670 stores computer-readable instructions 674 that cause the method 600 to be carried out by a processor 672. Instructions 674 may cause processor 672 to impose several print jobs, each comprising patterns to be printed, on a web of print medium frame by frame, in multiple parallel lanes in the longitudinal direction of the web of print medium, and to determine a fixed frame rewind distance and/or a repeat length for all frames as discussed previously.

At block 602, the processor 672 may set a frame repeat length to a difference between a frame length and a length of the longest pattern of any of the several print jobs. At block 604, the processor 672 may impose patterns of one of the print jobs in each lane along a length of the lane by beginning at a gap length calculated from a previous frame. At block 606, the processor 672 may calculate, as the gap length for the next frame, a sum of the gap length calculated from the previous frame and a combined length of the patterns imposed along the length of the lane, minus the frame repeat length. At block 608, the processor 672 may print the imposed print jobs on the web frame by frame. In some examples, the processor 672 may rewind the web of print medium by a fixed rewind distance, which may be the length of the longest pattern of any of the several print jobs after printing each frame.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

The invention claimed is:

1. A method for imposing several print jobs across a lane of a print medium web for frame-by-frame printing, each print job comprising a respective number of patterns to be printed, the method comprising:
    setting a frame rewind distance (FRD) to a length of the longest pattern;
    setting a frame repeat length (FRL) to a difference between a frame length and the FRD;
    for a first frame of the frame-by-frame printing:
        imposing patterns of one of the print jobs along a length of the lane, and
        preserving, as a respective gap length for the lane in a second frame, a distance that a tail end of the one of the patterns extends beyond the FRL; and
    for the second frame of the frame-by-frame printing, imposing patterns of one of the print jobs along a length of the lane beginning at the respective preserved gap length.

2. The method of claim 1, wherein the imposing comprises imposing patterns of multiple print jobs along the length of the lane.

3. The method of claim 1, comprising imposing patterns of one print job in one lane and patterns of another print job in another lane.

4. The method of claim 1, comprising producing a data file comprising the imposition of print jobs on the web of print medium, frame-by-frame, and the respective gap lengths for each frame.

5. The method of claim 4, wherein the data file comprises a table with the respective gap lengths and a Portable Document Format file with one page and/or multiple pages for each frame, or a JPG, JPEG, or other image format file(s) for each frame.

6. The method of claim 1, wherein each print job comprises a respective number of identical patterns to be printed.

7. The method of claim 1, wherein the gap length comprises a sum of a gap length preserved from a prior frame and a combined length of the patterns imposed along the length of the lane, minus the FRL.

8. The method of claim 7, wherein the combined length of the patterns includes a combined length of the patterns of multiple different print jobs imposed across the length of the lane.

9. A system for frame-by-frame printing of several print jobs on a web of print medium, each print job comprising patterns to be printed on one of multiple longitudinal lanes of the web, the system comprising instructions that cause a processor to:
    set a frame repeat length (FRL) to a difference between a frame length and a selected frame rewind distance (FRD);
    for each lane of the frame-by-frame printing:
    impose patterns of one of the print jobs along a length of the lane beginning at a gap length calculated from a previous frame, and
    calculate, as a gap length for a next frame, a distance that a tail end of the one of the patterns extends beyond the FRL; and
    print the imposed print jobs on the web frame-by-frame, wherein after printing each frame, the web of print medium is rewound by the selected FRD.

10. The system of claim 9, wherein the FRD is selected based on a length of the longest pattern of the several print jobs.

11. The system of claim 9, wherein patterns of multiple different print jobs are imposed along a length of the lane.

12. The system of claim 11, wherein patterns of multiple different print jobs are imposed along the length of the lane within a single frame.

13. The system of claim 9, wherein one print job is imposed in one lane and another print job is imposed in another lane, and/or multiple prints jobs are imposed on multiple lanes.

14. A non-transitory machine-readable storage medium for frame-by-frame printing of several print jobs on a web of print medium, each print job comprising patterns to be printed on one of multiple longitudinal lanes of the web, the medium comprising instructions that, in response to execution by a processor, cause the processor to:

set a frame repeat length (FRL) to a difference between a frame length and a length of the longest pattern of any of the several print jobs;

for each lane of the frame-by-frame printing:

impose patterns of one of the print jobs along a length of the lane beginning at a gap length calculated from a previous frame, and calculate, as a gap length for a next frame, a sum of the gap length calculated from the previous frame and a combined length of the patterns imposed along the length of the lane, minus the FRL; and print the imposed print jobs on the web frame-by-frame.

15. The non-transitory machine-readable medium of claim 14, comprising instructions to, after printing each frame, rewind the web of print medium by the length of the longest pattern of any of the several print jobs.

\* \* \* \* \*